US012334678B2

(12) United States Patent
Asano

(10) Patent No.: US 12,334,678 B2
(45) Date of Patent: Jun. 17, 2025

(54) CONNECTOR DEVICE HAVING INDIVIDUALLY ROCKABLE TERMINAL UNITS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yasunori Asano, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 329 days.

(21) Appl. No.: 17/909,982

(22) PCT Filed: Feb. 22, 2021

(86) PCT No.: PCT/JP2021/006561
§ 371 (c)(1),
(2) Date: Sep. 7, 2022

(87) PCT Pub. No.: WO2021/182087
PCT Pub. Date: Sep. 16, 2021

(65) Prior Publication Data

US 2023/0094904 A1 Mar. 30, 2023

(30) Foreign Application Priority Data

Mar. 13, 2020 (JP) ................................ 2020-044360

(51) Int. Cl.

| | |
|---|---|
| ***H01R 13/42*** | (2006.01) |
| ***H01R 12/71*** | (2011.01) |
| ***H01R 13/631*** | (2006.01) |

(52) U.S. Cl.
CPC ....... *H01R 13/6315* (2013.01); *H01R 12/716* (2013.01)

(58) Field of Classification Search
CPC ......................... H01R 13/6315; H01R 12/716; H01R 13/655; H01R 12/73; H01R 13/629;
(Continued)

(56) References Cited

U.S. PATENT DOCUMENTS 4,788,518 A * 11/1988 Sako ................... H01H 83/223 337/45
5,344,347 A * 9/1994 Inoue ................ H01R 13/6271 439/924.1
(Continued)

FOREIGN PATENT DOCUMENTS

DE 10057143 A1 11/2000

OTHER PUBLICATIONS

International Search Report issued on May 18, 2021 for WO 2021/182087 A1 (4 pages).

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

It is aimed to provide a connector device excellent in the reliability of a connecting operation. A connector device (A) is provided with a second housing (21) to be mounted on a second circuit board (C), a plurality of fixed terminal units (28) to be mounted in the second housing (21) and connected to the second circuit board (C), a plurality of movable terminal units (35) individually rockable with the plurality of fixed terminal units (28) as fulcrums and to be being individually connected to a plurality of first terminal units (16), and a coupling member 50 including a hooking portion (51) to be hooked to the plurality of movable terminal units (35), the coupling member 50 integrally rocking the plurality of movable terminal units (35).

8 Claims, 5 Drawing Sheets

(58) Field of Classification Search
CPC .... H01R 2105/00; H01R 24/50; H01R 24/54; H01R 12/91
See application file for complete search history.

(56) References Cited

U.S. PATENT DOCUMENTS

| | | | | |
|---|---|---|---|---|
| 5,879,177 | A | 3/1999 | Honma | |
| 8,801,459 | B2 | 8/2014 | Mrowka | |
| 2003/0087542 | A1 * | 5/2003 | Yamakawa | H01R 13/7031 439/93 |
| 2014/0357131 | A1 * | 12/2014 | Oshida | H01R 12/712 439/626 |
| 2015/0126061 | A1 | 5/2015 | Paynter | |
| 2015/0280370 | A1 * | 10/2015 | Huang | H01R 24/46 439/188 |
| 2016/0172780 | A1 * | 6/2016 | Tamai | H01R 12/712 439/733.1 |
| 2016/0172803 | A1 * | 6/2016 | Tamai | H01R 13/6473 439/676 |
| 2016/0314920 | A1 * | 10/2016 | Aratani | H01H 50/02 |
| 2018/0026384 | A1 * | 1/2018 | Shibuya | H01R 12/737 439/637 |
| 2020/0176207 | A1 * | 6/2020 | Kubono | H01H 50/24 |

* cited by examiner

CONNECTOR DEVICE HAVING INDIVIDUALLY ROCKABLE TERMINAL UNITS

CROSS REFERENCE TO RELATED APPLICATIONS

This application is a national phase of PCT application No. PCT/JP2021/006561, filed on 22 Feb. 2021, which claims priority from Japanese patent application No. 2020-044360, filed on 13 Mar. 2020, all of which are incorporated herein by reference.

TECHNICAL FIELD

The present disclosure relates to a connector device.

BACKGROUND

Patent Document 1 discloses a connector device including a first connector and a second connector facing each other and configured to connect the both connectors via an adapter. The adapter is attached relatively rockably to the first connector. When the first and second connectors deviate in position in a direction intersecting a facing direction, the adapter tilts to absorb position deviations of the both connectors, wherefore the both connectors can be connected.

PRIOR ART DOCUMENT

Patent Document

Patent Document 1: US Patent Publication No. 8801459

SUMMARY OF THE INVENTION

Problems to be Solved

In the case of applying the above connection structure for connecting the first and second connectors via the adapter to a multipole connector, there is a concern for the following problem. Since the adapter is freely rockable with respect to the first connector, each adapter possibly tilts in a direction different from other adapters in a state where the first and second connectors are not connected yet. Thus, when an attempt is made to connect a plurality of the first connectors and a plurality of the second connectors, it is difficult to connect a plurality of the adapters to the second connectors at once.

A connector of the present disclosure was completed on the basis of the above situation and aims to provide a connector device excellent in the reliability of a connecting operation.

Means to Solve the Problem

The present disclosure is directed to a connector device with a housing to be mounted on a circuit board, a plurality of fixed terminal units to be mounted in the housing and connected to the circuit board, a plurality of movable terminal units individually rockable with the plurality of fixed terminal units as fulcrums, the plurality of movable terminal units being individually connected to a plurality of mating terminal units, and a coupling member including a hooking portion to be hooked to the plurality of movable terminal units, the coupling member integrally rocking the plurality of movable terminal units.

Effect of the Invention

The connector device of the present disclosure is excellent in the reliability of a connecting operation.

DETAILED DESCRIPTION TO EXECUTE THE INVENTION

Description of Embodiments of Present Disclosure

Figure 1:
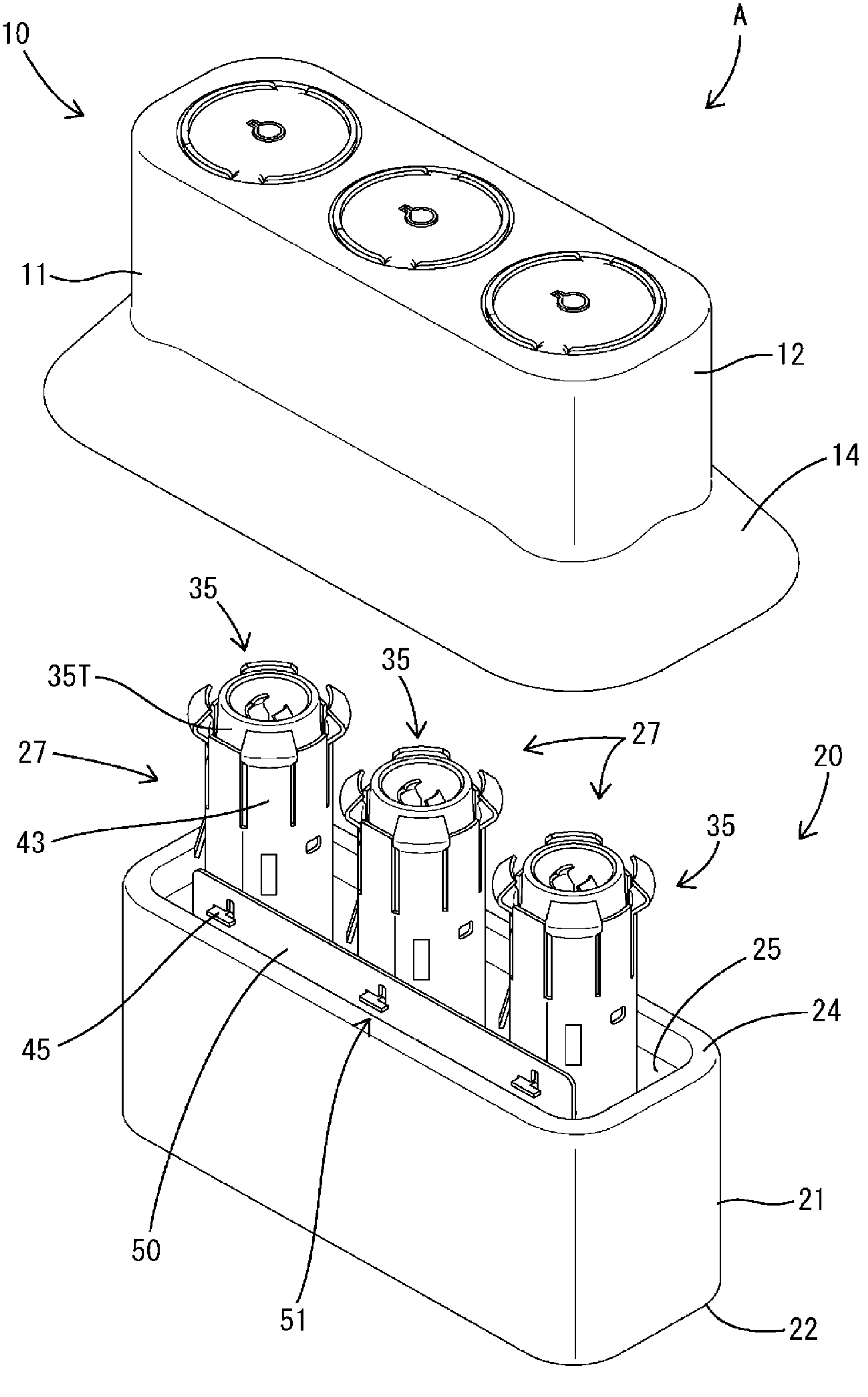
FIG. 1 is a perspective view showing a state where a first connector and a second connector are separated.

First, embodiments of the present disclosure are listed and described.

(1) The connector device of the present disclosure is provided with a housing to be mounted on a circuit board, a plurality of fixed terminal units to be mounted in the housing and connected to the circuit board, a plurality of movable terminal units individually rockable with the plurality of fixed terminal units as fulcrums, the plurality of movable terminal units being individually connected to a plurality of mating terminal units, and a coupling member including a hooking portion to be hooked to the plurality of movable terminal units, the coupling member integrally rocking the plurality of movable terminal units. According to the configuration of the present disclosure, since the plurality of movable terminal units are integrally rocked by the coupling member, the plurality of movable terminal units are kept in a fixed positional relationship. In this way, the plurality of movable terminal units are reliably connected to the plurality of mating terminal units. Therefore, the connector device of the present disclosure is excellent in connecting function.

(2) Preferably, the movable terminal unit has an elongated shape projecting toward a front surface side of the housing from the fixed terminal unit, the housing includes a peripheral wall portion surrounding the plurality of movable terminal units, and the coupling member is arranged in a region surrounded by the peripheral wall portion when the housing is viewed in a connecting direction from the mating terminal units. According to this configuration, the connector device can be reduced in size in a view in the connecting direction.

(3) Preferably, in (2), the coupling member is plate-like and so arranged that a plate thickness direction of the coupling member is orientated in the same direction as a facing direction of outer surfaces of the movable terminal units and an inner surface of the peripheral wall portion.

According to this configuration, the connector device can be further reduced in size in the view in the connecting direction.

(4) Preferably, the hooking portion is composed of a plurality of coupling holes penetrating through the coupling member, and projections to be passed through the coupling holes and hooked to hole edge parts of the coupling holes are formed on outer peripheral surfaces of the movable terminal units. According to this configuration, since the movable terminal units and the coupling member are coupled by passing the projections through the coupling holes and hooking the projections to the coupling holes, a structure is simple.

(5) Preferably, in (4), the projection is formed of a plastically deformable plate member, the projection is formed with a base portion connected to the outer peripheral surface of the movable terminal unit and projecting to an outer surface side of the coupling member through the coupling hole and a retaining portion extending from the base portion and arranged to face a region of the outer surface of the coupling member not corresponding to the coupling hole, and a boundary line between the base portion and the retaining portion extends in a direction orthogonal to the outer surface of the coupling member. According to this configuration, the coupling member is assembled with the movable terminal unit by passing the projection having the same shape as the coupling hole through the coupling hole and, thereafter, bending the retaining portion with respect to the base portion. Since the retaining portion can be bent with the base portion held by a jig or the like, a bending force applied to the retaining portion does not act on the outer peripheral surface of the movable terminal unit. In this way, the deformation of the outer peripheral surface of the movable terminal unit can be prevented.

(6) Preferably, in (5), the coupling hole includes a slit-like holding hole portion, the base portion being passed through the holding hole portion, and a slit-like mounting hole portion extending from an end part of the holding hole portion in a direction intersecting the holding hole portion. According to this configuration, in assembling the coupling member with the movable terminal unit, the shape of the projection is so prepared in advance that the base portion corresponds to the holding hole portion and the retaining portion corresponds to the mounting hole portion. In this state, the projection is passed through the coupling hole and, thereafter, the retaining portion is bent. Since the holding hole portion and the mounting hole portion are connected to form a bent shape, the base portion passed through the holding hole portion does not move to the mounting hole portion. In this way, large position deviations of the coupling member and the movable terminal unit can be prevented.

(7) Preferably, in (4) to (6), a clearance for allowing the coupling member and the movable terminal unit to relatively tilt is provided between the projection and the hole edge part of the coupling hole. According to this configuration, when the movable terminal unit rocks, the projection does not strongly interfere with the hole edge part of the coupling hole. Therefore, the deformation of the projection and the hole edge part of the coupling hole can be prevented.

(8) Preferably, an outer peripheral surface of the movable terminal unit is constituted by an outer conductor, and the coupling member is electrically conductive and in contact with a plurality of the outer conductors. According to this configuration, grounding performance is improved since potential differences among the plurality of movable outer conductors can be prevented.

DETAILS OF EMBODIMENT OF PRESENT DISCLOSURE

Embodiment

Figure 4:
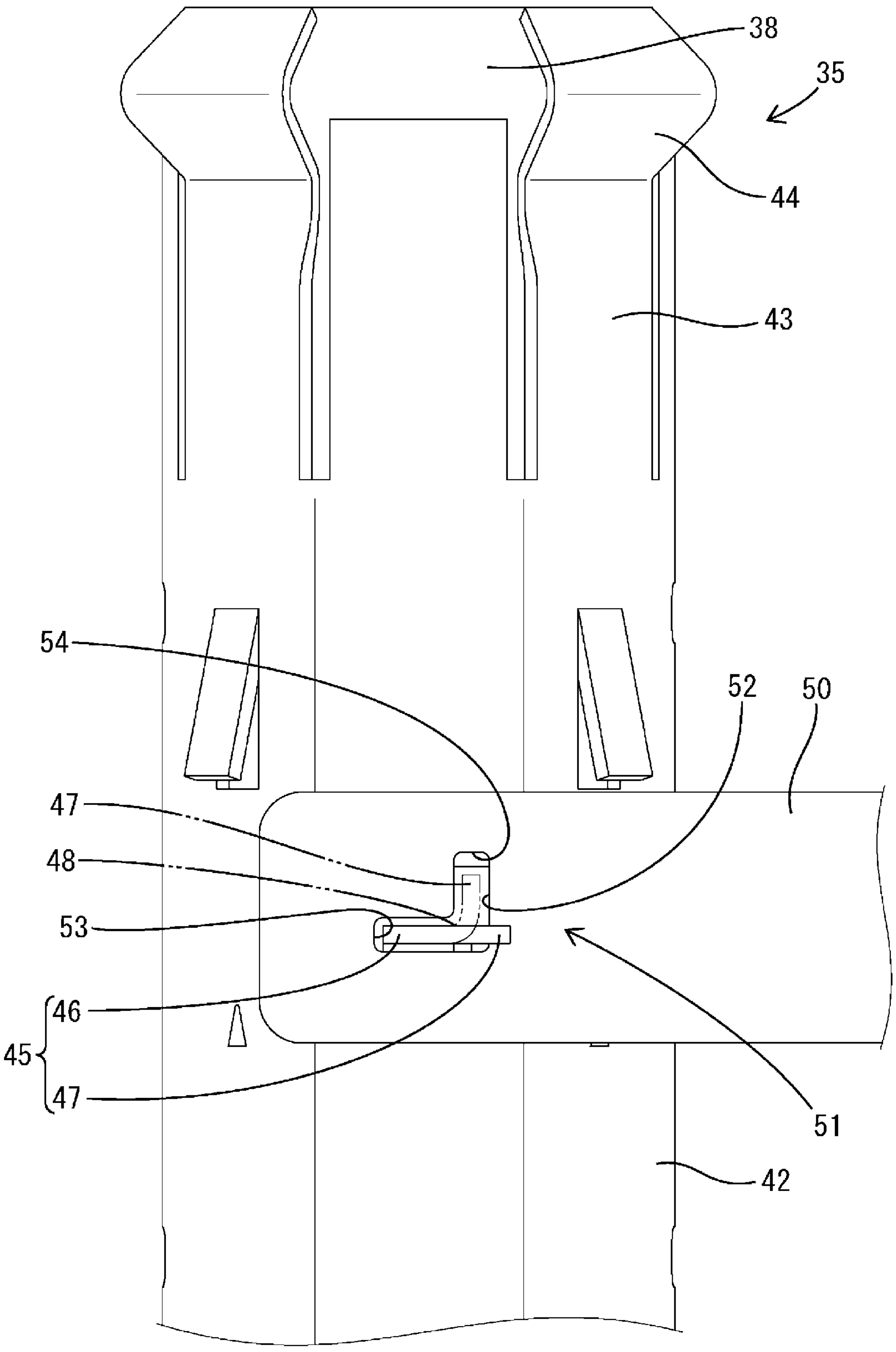
FIG. 4 is a partial enlarged side view showing a coupling structure of the movable terminal unit and the coupling member.
Figure 5:
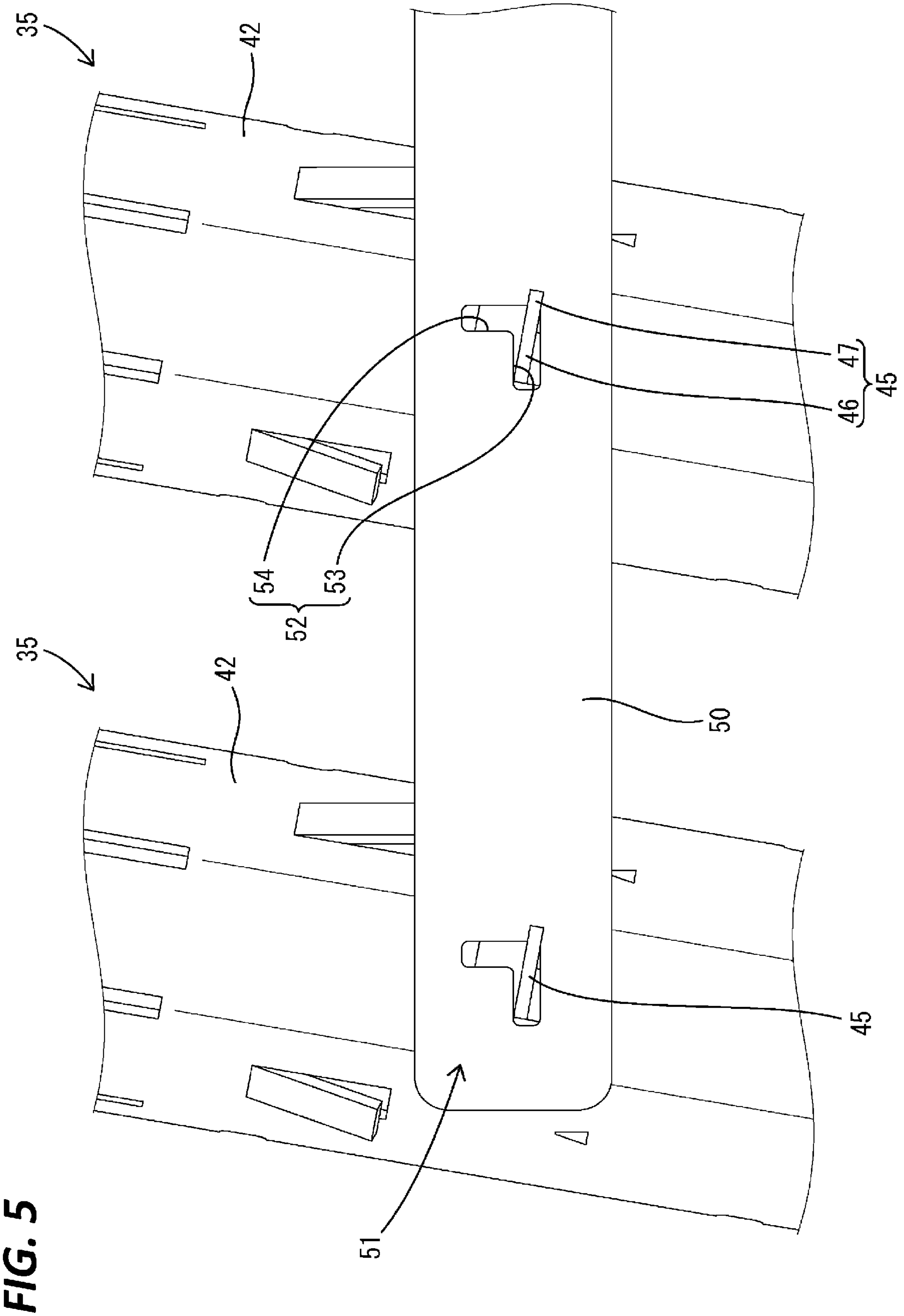
FIG. 5 is a partial enlarged side view showing a state where a plurality of the movable terminal units are integrally rocking.

A specific embodiment of a connector device A of the present disclosure is described below with reference to FIGS. 1 to 5. Note that the present invention is not limited to these illustrations and is intended to be represented by claims and include all changes in the scope of claims and in the meaning and scope of equivalents. In this embodiment, upper and lower sides shown in FIGS. 1 to 5 are directly defined as upper and lower sides concerning a vertical direction. Left and right sides shown in FIGS. 4 and 5 are directly defined as left and right sides concerning a lateral direction.

Figure 2:
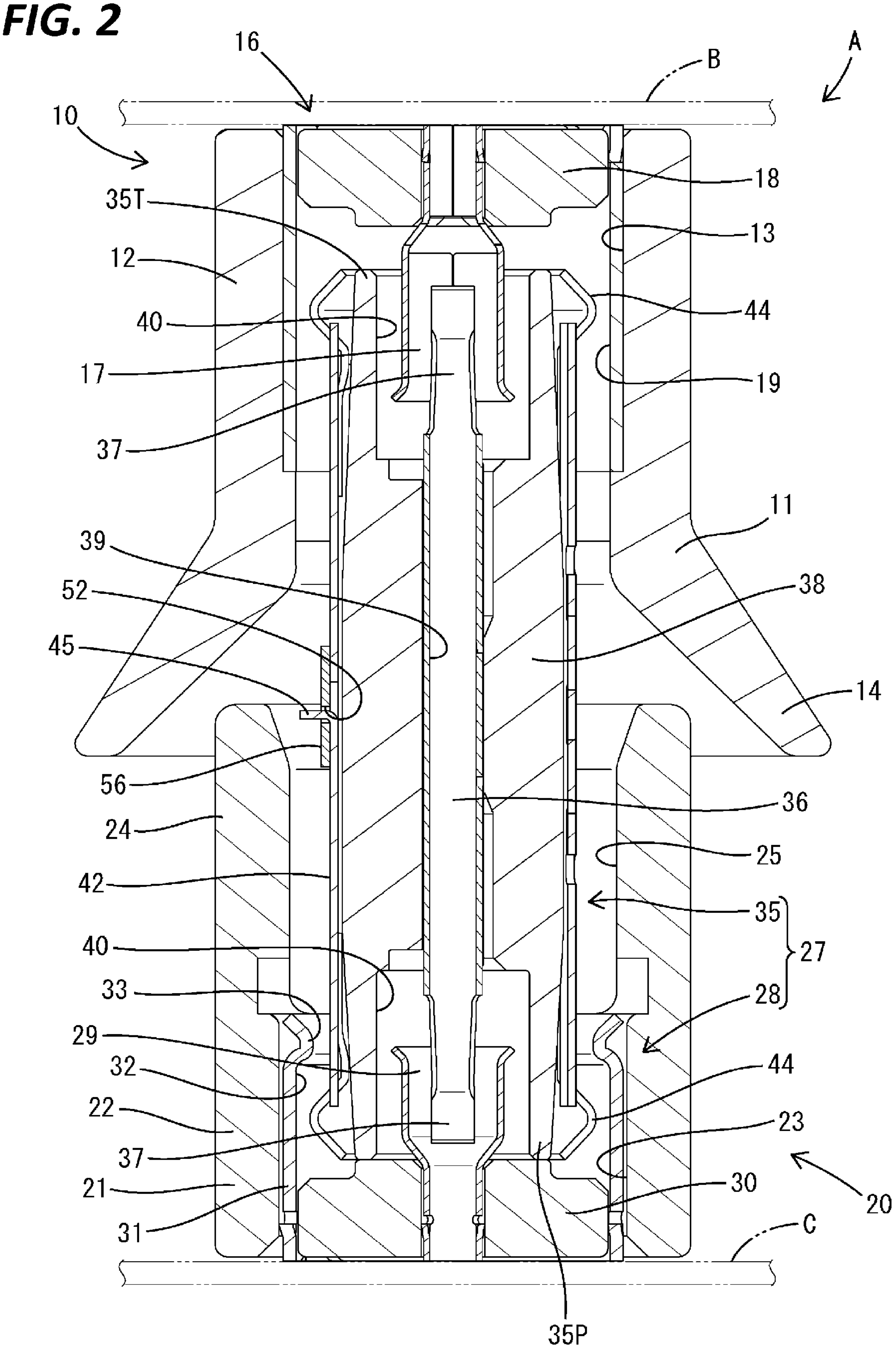
FIG. 2 is a section showing a state where the first and second connectors are connected.

The connector device A of this embodiment includes a first connector 10 and a second connector 20 as shown in FIG. 1. As shown in FIG. 2, the first connector 10 is mounted on a first circuit board B, and the second connector 20 is mounted on a second circuit board C. The first circuit board B is, for example, provided in an antenna (not shown) mounted on a roof (not shown) of an automotive vehicle. The first circuit board B is horizontally arranged with a mounting surface facing down, i.e. facing the interior of the vehicle. The second circuit board C is, for example, provided in an ECU mounted on the roof of the automotive vehicle and horizontally arranged with a mounting surface facing up, i.e. facing toward the antenna. The first and second circuit boards B, C are arranged in such a positional relationship that the mounting surfaces of the both are facing in parallel.

The first and second connectors 10, 20 are electrically conductively connected by bringing the first circuit board B closer to the second circuit board C. By connecting the both connectors 10, 20, the first and second circuit boards B, C are connected without via a wiring harness and high-speed communication is possible between the first and second circuit boards B, C. Since assembling tolerances between the roof and the antenna are relatively large in an antenna mounted part of the roof of the automotive vehicle, position deviation possibly occurs between the first and second circuit boards B, C in a horizontal direction intersecting a connecting direction of the both connectors 10, 20. The connector device A of this embodiment is configured such that the both connectors 10, 20 are connected while position deviations of the both circuit boards B, C are absorbed.

As shown in FIG. 2, the first connector 10 includes one first housing 11 and a plurality of first terminal units 16. With the first connector 10 mounted on the first circuit board B, the upper surface of the first housing 11 is fixed to the first circuit board B and upper end parts of the plurality of first terminal units 16 are connected to a printed circuit (not shown) of the first circuit board B. The first housing 11 is a single component made of synthetic resin and including a rectangular parallelepiped first terminal holding portion 12 and a rectangular guiding portion 14. The first terminal holding portion 12 is formed with a plurality of (three in this embodiment) first terminal accommodation chambers 13 vertically penetrating through the first terminal holding portion 12. In a bottom view of the first connector 10, the first terminal accommodation chambers 13 are circular. The plurality of first terminal accommodation chambers 13 are arranged to be aligned side by side in a row in the lateral direction.

The guiding portion 14 is in the form of a skirt projecting obliquely downward from the outer peripheral edge on the lower end of the first terminal holding portion 12. The guiding portion 14 is inclined downward to be widened toward a lower side in the connecting direction of the both connectors 10, 20. The guiding portion 14 is continuous over the entire periphery of the first terminal holding portion 12. In a plan view, the guiding portion 14 surrounds all the plurality of first terminal accommodation chambers 13. An internal space of the guiding portion 14, i.e. a space surrounded by the guiding portion 14, communicates with the plurality of first terminal accommodation chambers 13 and is open downward of the first housing 11.

The plurality of first terminal units 16 are individually accommodated in the plurality of first terminal accommodation chambers 13. The first terminal unit 16 includes a first inner conductor 17 made of metal, a first dielectric 18 made of synthetic resin and a first outer conductor 19 made of metal. The first inner conductor 17 has a tubular shape having an axis oriented in parallel to the connecting direction of the both connectors 10, 20. The first dielectric 18 has a disk shape including a center hole. An upper end part of the first inner conductor 17 is fit into the center hole of the first dielectric 18 and a lower end part thereof projects downwardly of the first dielectric 18. The first outer conductor 19 has a hollow cylindrical shape coaxially surrounding the first inner conductor 17 and the first dielectric 18 and is fit to the inner peripheral surface of the first terminal accommodation chamber 13.

As shown in FIG. 2, the second connector 20 includes a second housing 21 and as many second terminal units 27 as the first terminal units 16. Each second terminal unit 27 includes one fixed terminal unit 28 and one movable terminal unit 35. With the second connector 20 mounted on the second circuit board C, the lower surface of the second housing 21 is fixed to the second circuit board C, and lower end parts of the plurality of fixed terminal units 28 are connected to a printed circuit (not shown) of the second circuit board C. The second housing 21 is a single component made of synthetic resin and including a rectangular parallelepiped second terminal holding portion 22 and a rectangular peripheral wall portion 24.

The second terminal holding portion 22 is formed with as many second terminal accommodation chambers 23 as the second terminal units 27. The second terminal accommodation chambers 23 vertically penetrate through the second terminal holding portion 22. In a plan view of the second connector 20, the second terminal accommodation chambers 23 are circular. The plurality of second terminal accommodation chambers 23 are arranged to be aligned side by side in a row in the lateral direction, similarly to the plurality of first terminal accommodation chambers 13.

The peripheral wall portion 24 projects upward in parallel to the connecting direction of the both connectors 10, 20 from the outer peripheral edge of the upper end of the second terminal holding portion 22. In a plan view, the peripheral wall portion 24 surrounds all the plurality of second terminal accommodation chambers 23. Out of the second housing 21, a space defined by the peripheral wall portion 24 above the second terminal holding portion 22 functions as a rocking space 25. The rocking space 25 surrounded by the peripheral wall portion 24 is open upward of the second housing 21, i.e. toward the first connector 10.

The plurality of fixed terminal units 28 are individually accommodated in the plurality of second terminal accommodation chambers 23. The fixed terminal unit 28 includes a fixed inner conductor 29 made of metal, a fixed dielectric 30 made of synthetic resin and a fixed outer conductor 31 made of metal. The fixed inner conductor 29 is the same component as the first inner conductor 17. The fixed inner conductor 29 is arranged in an orientation vertically inverted from that of the first inner conductor 17 in an axial direction. The fixed dielectric 30 is the same component as the first dielectric 18, and arranged in an orientation vertically inverted from that of the first dielectric 18 in the axial direction. A lower end part of the fixed inner conductor 29 is fit into a center hole of the fixed dielectric 30 and an upper end part thereof projects upwardly of the fixed dielectric 30.

The fixed outer conductor 31 has a hollow cylindrical shape coaxially surrounding the fixed inner conductor 29 and the fixed dielectric 30 and is fit to the inner peripheral surface of the second terminal accommodation chamber 23. Out of the fixed outer conductor 31, a space above the fixed dielectric 30 functions as a support space 32 open upward. In the support space 32, an upper end part of the fixed inner conductor 29 projects upward. Each support space 32 communicates with the rocking space 25. A diameter-reduced portion 33 continuous over an entire periphery is formed on the inner periphery of an upper end part of the fixed outer conductor 31. The diameter-reduced portion 33 is arranged in the support space 32 and shaped to bulge radially inward.

Figure 3:
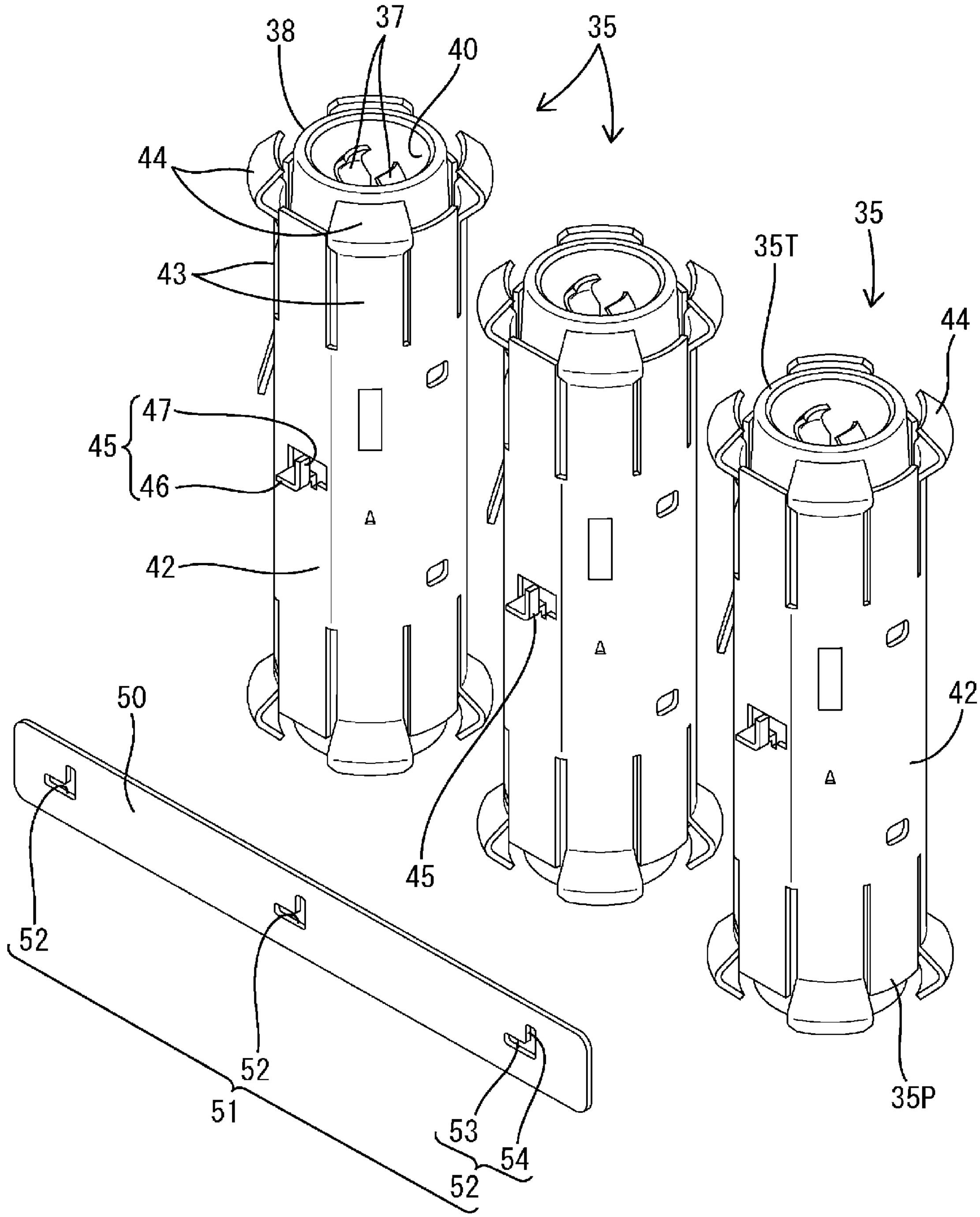
FIG. 3 is a perspective view showing a state before movable terminal units and a coupling member are assembled.

As shown in FIGS. 1 to 3, the movable terminal unit 35 has an elongated shape as a whole. Both end parts in the axial direction of the movable terminal unit 35 are symmetrical to have the same shape when the movable terminal unit 35 is inverted. The movable terminal unit 35 is a member including a movable inner conductor 36 made of metal, a movable dielectric 38 made of synthetic resin and a movable outer conductor 42 made of metal. The movable inner conductor 36 has a tubular shape elongated in the axial direction of the movable terminal unit 35. A pair of resilient claw pieces 37 respectively resiliently deformable in a radial direction are formed on each of both end parts in the axial direction of the movable inner conductor 36.

The movable dielectric 38 is made of synthetic resin and has a hollow cylindrical shape coaxial with an axis of the movable terminal unit 35. The movable inner conductor 36 is coaxially accommodated in an insertion hole 39 of the movable dielectric 38. Circular accommodation recesses 40 are formed in both end parts in the axial direction of the movable dielectric 38 by coaxially recessing both end surfaces of the movable dielectric 38. The accommodation recesses 40 are formed by widening both end parts in the axial direction of the insertion hole 39 in diameter. The resilient claw pieces 37 of the movable inner conductor 36 are located in the accommodation recesses 40.

The movable outer conductor 42 has a hollow cylindrical shape as a whole. A plurality of resilient arm portions 43 disposed at intervals in a circumferential direction are formed on both end parts in axial direction of the movable outer conductor 42. The resilient arm portion 43 is cantilevered toward an axial end side and resiliently deformable in a radial direction. An diameter-expanded portion 44 is formed on an extending end part of the resilient arm portion 43. The movable outer conductor 42 is fit to the outer periphery of the movable dielectric 38.

One end part of the movable terminal unit 35 is mounted as a base end part 35P of the movable terminal unit 35 into the fixed terminal unit 28. In mounting, the base end part 35P of the movable terminal unit 35 is inserted into the support space 32 of the second connector 20. With the movable terminal unit 35 mounted in the fixed terminal unit 28, an upper end part of the fixed inner conductor 29 is accommodated in the accommodation recess 40, and the resilient claw pieces 37 of the movable inner conductor 36 resiliently contact the inner periphery of the upper end part of the fixed inner conductor 29. The resilient arm portions 43 of the movable outer conductor 42 are resiliently deformed and the diameter-expanded portions 44 resiliently contact the inner periphery of the fixed outer conductor 31.

The diameter-expanded portions 44 of the movable outer conductor 42 are locked to the diameter-reduced portion 33 of the fixed outer conductor 31, whereby the movable terminal unit 35 is restricted from being separated from the fixed terminal unit 28. Even if the movable terminal unit 35 is vertically inverted to project downward from the fixed terminal unit 28, a locked state of the diameter-expanded portions 44 and the diameter-reduced portion 33 is kept. The movable terminal unit 35 can individually rock independently of the other movable terminal units 35 with a contact part of the base end part 35P and the fixed terminal unit 28 as a fulcrum. Even if the movable terminal unit 35 rocks in a front-rear direction or lateral direction with respect to the fixed terminal unit 28, the locked state of the diameter-expanded portions 44 and the diameter-reduced portion 33 is kept.

The movable terminal unit 35 mounted in the fixed terminal unit 28 projects upward from the second housing 21. The other end part, i.e. an upper end part, of the movable terminal unit 35 is connected as a tip part 35T of the movable terminal unit 35 to the first terminal unit 16 as a mating terminal. Here, since one movable terminal unit 35 is supported in contact with only one fixed terminal unit 28, the plurality of movable terminal units 35 can individually rock in directions different from the other movable terminal units 35. With the plurality of movable terminal units 35 rocking in mutually different directions, the tip parts 35T of the plurality of movable terminal units 35 can be simultaneously connected to the plurality of first terminal units 16 when the first and second connectors 10, 20 are connected. A configuration for simultaneously connecting the tip parts 35T of the plurality of movable terminal units 35 to the plurality of first terminal units 16 is described below.

A projection 45 is formed on the outer peripheral surface of the movable terminal unit 35. The projection 45 is a part constituting the movable outer conductor 42 and formed of a plate member made of plastically deformable metal. The projection 45 includes a base portion 46 and a retaining portion 47. The base portion 46 is in the form of a flat plate connected to the outer peripheral surface of the movable outer conductor 42 and projecting radially outward from the outer peripheral surface of the movable outer conductor 42. The base portion 46 is parallel to an arrangement direction of the plurality of movable terminal units 35, and a thickness direction thereof is oriented in the vertical direction parallel to a length direction of the movable terminal unit 35.

The retaining portion 47 projects from one (right end edge) of both lateral end edges of the base portion 36. The retaining portion 47 is connected only to a region on a projecting end side of the right end edge of the base portion 46. With a coupling member 50 to be described later attached to the movable terminal unit 35, the retaining portion 47 projects perpendicularly upward from the right end edge of the base portion 46. That is, in a front view of the movable terminal unit 35, the projection 45 has a shape obtained by mirror-inverting an L shape, similarly to a coupling hole 52 of the coupling member 50. The rear end edge of the base portion 46 and the lower end edge of the retaining portion 47 constitute a boundary line 48 between the base portion 46 and the retaining portion 47 (see FIG. 4). This boundary line 48 extends in a direction orthogonal to the outer surface of the coupling member 50.

The second connector 20 is provided with the coupling member 50. The coupling member 50 is a flat plate member made of metal and stamped into a rectangular shape elongated in the lateral direction by press-working. In a plan view of the second connector 20, i.e. in a view of the second housing 21 viewed in the connecting direction from the first terminal units 16, the coupling member 50 is arranged between the outer surfaces of the movable terminal units 35 and the peripheral wall portion 24. As shown in FIG. 2, a thickness direction of the coupling member 50 is oriented in the same direction as a facing direction (front-rear direction) of the outer surfaces of the movable terminal units 35 and the inner surface of the peripheral wall portion.

The coupling member 50 is formed with a hooking portion 51 for coupling the plurality of movable terminal units 35. The hooking portion 51 is composed of as many slit-like coupling holes 52 as the movable terminal units 35. The plurality of coupling holes 52 are arranged at the same intervals as the plurality of movable terminal units 35 in the lateral direction. The coupling holes 52 penetrate through the coupling member 50 in the plate thickness direction, i.e. in a direction perpendicular to both the length direction (vertical direction) of the movable terminal units 35 and the arrangement direction (lateral direction) of the plurality of movable terminal units 35. As shown in FIGS. 4 and 5, in a side view of the coupling member 50, the coupling holes 52 have a shape obtained by mirror-inverting an L shape.

The coupling hole 52 includes a slit-like holding hole portion 53 and a slit-like mounting hole portion 54. The holding hole portion 53 extends in parallel to the arrangement direction (lateral direction) of the plurality of movable terminal units 35. The mounting hole portion 54 extends in parallel to the length direction (vertical direction) of the movable terminal unit 35. One end part (rear end part) of the holding hole portion 53 and one end part (lower end part) of the mounting hole portion 54 communicate at right angles with each other.

A length in the lateral direction of the holding hole portion 53 is slightly larger than that of the base portion 46 of the projection 45. A vertical dimension (width) of the holding hole portion 53 is slightly larger than a thickness of the base portion 46. A length in the vertical direction of the mounting hole portion 54 is slightly larger than a length in the lateral direction of the retaining portion 47. A dimension in the lateral direction (width) of the mounting hole portion 54 is larger than a thickness in the vertical direction of the retaining portion 47.

Next, a procedure of assembling the first terminal units 28, the movable terminal units 35 and the coupling member 50 in the second connector 20 is described. First, the plurality of movable terminal units 35 are coupled by the coupling member 50. In coupling, the projections 45 are formed into a shape obtained by mirror-inverting an L shape, similarly to the coupling holes 52, as indicated by an imaginary line in FIG. 4. Subsequently, the plurality of coupling holes 52 are individually fit to the plurality of projections 45. At this time, the base portions 46 are passed through the holding hole portions 53 and the retaining portions 47 are passed through the mounting hole portions 54.

After the projection 45 is passed through the coupling hole 52, the base portion 46 and the retaining portion 47 are individually held by an automatic machine, a jig or the like, and the retaining portion 47 is relatively displaced by 90° with respect to the base portions 46. At this time, since the base portion 46 is fixed by the automatic machine, the jig or the like, even if a reaction force acts on the side of the base portion 46 from the side of the retaining portion 47 when the retaining portion 47 is bent, that reaction force is not transferred to the movable outer conductor 42. Therefore, the deformation of the movable outer conductor 42 can be prevented when the retaining portion 47 is bent.

If the retaining portion 47 is displaced, the base portion 46 and the retaining portion 47 are shaped to extend straight in the lateral direction as shown in FIGS. 4 and 5. If the projection 45 is plastically deformed such that the retaining portion 47 and the base portion 46 become straight, the retaining portion 47 is displaced to a position turned by 90° with respect to the mounting hole portion 54 and faces a region of the outer surface of the coupling member 50 not corresponding to the coupling hole 52. That is, a tip part of the retaining portion 47 on a side opposite to the base portion 46 and the boundary line 48 is located outside the coupling hole 52 to face the outer surface of the coupling member 50. In this way, even if an attempt is made to separate the coupling member 50 from the outer peripheral surface of the movable terminal unit 35 in the radial direction (front-rear direction), the tip part of the retaining portion 47 functions as a stopper and is hooked to the outer surface of the coupling member 50. Thus, the coupling member 50 is not separated from the movable terminal unit 35.

A clearance is secured between the base portion 46 and the hole edge part of the holding hole portion 53. That clearance is a necessary minimum space for allowing the movable terminal unit 35 and the coupling hole 52 to tilt. Therefore, even if an attempt is made to displace the coupling member 50 in two-dimensional directions including the lateral direction and vertical direction with respect to the movable terminal unit 35, relative displacement amounts of the coupling member 50 and the movable terminal unit 35 are not large.

After the coupling member 50 is attached to the plurality of movable terminal units 35 to couple the plurality of movable terminal units 35, the plurality of movable terminal units 35 are mounted into the fixed terminal units 28. In mounting the movable terminal units 35, the base end parts 35P of the movable terminal units 35 are inserted into the rocking space 25 and fit into the support spaces 32 of the fixed terminal units 28. Note that the coupling member 50 may be attached to the second housing 21 after the movable terminal units 35 are mounted into the fixed terminal units 28.

Each movable terminal unit 35 is restricted from being relatively displaced with respect to the coupling member 50, whereby relative displacements among the movable terminal units 35 are restricted by the coupling member 50. If an external force in a rocking direction acts on any one of the movable terminal units 35, the plurality of movable terminal units 35 rock in unison by the same angle and in the same direction integrally with the coupling member 50 as shown in FIG. 5. Thus, a positional relationship of the tip parts 35T of all the movable terminal units 35 is kept in a fixed positional relationship regardless of the rocking direction and rocking angle of the movable terminal units 35. The plurality of tip parts 35T kept in the fixed positional relationship are in the same arrangement as the plurality of first terminal units 16. The movable terminal unit 35 rocks with a connected part of the fixed terminal unit 28 and the base end part 35P of the movable terminal unit 35 as a fulcrum. The rocking angle of the movable terminal unit 35 is maximized when the movable terminal unit 35 comes into contact with the peripheral wall portion 24.

A displacement amount of the coupling member 50 when the movable terminal unit 35 tilts becomes larger as the contact position of the coupling member 50 approaches the tip part 35T of the movable terminal unit 35. A pressing force generated between the movable terminal unit 35 and the coupling member 50 when the movable terminal unit 35 sliding in contact with the guiding portion 14 pushes the coupling member 50 in a horizontal direction increases as the contact position of the coupling member 50 approaches the base end part 35P of the movable terminal unit 35. Since the contact position of the coupling member 50 is a middle position between the base end part 35P and the tip part 35T in this embodiment, the pressing force generated between the movable terminal unit 35 and the coupling member 50 can be reduced while the displacement amount of the coupling member 50 when the movable terminal unit 35 tilts is suppressed.

If the first and second circuit boards B, C are relatively displaced when the first and second connectors 10, 20 are connected, the tip part 35T of any one of the movable terminal units 35 comes into contact with the inner surface of the guiding portion 14. If the connection of the both connectors 10, 20 further proceeds from this state, the tip part 35T of the movable terminal unit 35 slides in contact with the inclined inner surface of the guiding portion 14, whereby the tip parts 35T of all the movable terminal units 35 are guided to connection positions to the first terminal units 16 while changing the rocking angles at once. During this time, the base end parts 35P of the movable terminal units 35 rock in the rocking space 25 and the tip parts 35T of the movable terminal units 35 rock inside the guiding portion 14.

After passing over the guiding portion 14, the tip parts 35T of the movable terminal units 35 are connected to the first terminal units 16 and the first and second connectors 10, 20 are properly connected. If the both connectors 10, 20 are properly connected, the first and second circuit boards B, C are connected via the first terminal units 16 and the second terminal units 27.

The connector device A of this embodiment is provided with the first connector 10 to be mounted on the first circuit board B and the second connector 20 to be mounted on the second circuit board C. The first connector 10 includes the plurality of first terminal units 16 each configured such that the first inner conductor 17 is surrounded by the first outer conductor 19. The second connector 20 includes the first housing 11 to be mounted on the second circuit board C, the plurality of fixed terminal units 28 and the plurality of movable terminal units 35. The fixed terminal units 28 are mounted in the second housing 21 and connected to the first circuit board C. The movable terminal units 35 are individually rockable with the plurality of fixed terminal units 28 as fulcrums. The movable terminal units 35 are individually connected to the plurality of first terminal units 16. The coupling member 50 includes the hooking portion 51 to be hooked to the plurality of movable terminal units 35 and integrally rocks the plurality of movable terminal units 35.

Since the plurality of movable terminal units 35 are integrally rocked by the coupling member 50, the tip parts 35T of the plurality of movable terminal units 35 are kept in the same positional relationship as the array of the plurality of first terminal units 16 regardless of at which angle and in which direction the movable terminal units 35 are rocked. In this way, the plurality of movable terminal units 35 are reliably connected to the plurality of first terminal units 16. Therefore, the connector device A of this embodiment is excellent in the reliability of a connecting operation.

The movable terminal unit 35 is a member separate from the fixed terminal unit 28. The movable outer conductor 42 of the movable terminal unit 35 includes the diameter-expanded portions 44. The fixed outer conductor 31 of the fixed terminal unit 28 includes the diameter-reduced portion 33. The diameter-expanded portions 44 and the diameter-reduced portion 33 function as a supporting portion for rockably supporting the movable terminal unit 35 with respect to the fixed terminal unit 28. According to this configuration, even if the second connector 20 is so oriented that the movable terminal units 35 project downward from the fixed terminal units 28, the movable terminal units 35 can be held in the fixed terminal units 28.

The movable terminal unit 35 projects toward a front surface side of the second housing 21 from the fixed terminal unit 28 and is shaped to be elongated in a projecting direction. The second housing 21 includes the peripheral wall portion 24 surrounding the plurality of movable terminal units 35. The coupling member 50 is arranged in a region surrounded by the peripheral wall portion 24 when the second housing 21 is viewed in the connecting direction from the first terminal units 16. According to this configuration, the connector device A can be reduced in size when viewed in the connecting direction.

The plate-like coupling member 50 is so arranged that a plate thickness direction of the coupling member 50 is oriented in the same direction as the facing direction of the outer surfaces of the movable terminal units 35 and the inner surface of the peripheral wall portion 24. In other words, the plate thickness direction of the coupling member 50 is set in a direction orthogonal to the arrangement direction of the movable terminal units 35. According to this configuration, since the coupling member 50 can be accommodated in a gap between the movable terminal units 35 and the inner surface of the peripheral wall portion 24, the connector device can be further reduced in size when viewed in the connecting direction.

The hooking portion 51 is composed of the plurality of coupling holes 52 penetrating through the coupling member 50. The projection 45 passed through the coupling hole 52 is formed on the outer peripheral surface of the movable terminal unit 35. The retaining portion 47 of the projection 45 is hooked to the hole edge part of the coupling hole 52, whereby a coupled state of the coupling member 50 and the movable terminal unit 35 is kept. According to this configuration, since the movable terminal unit 35 and the coupling member 50 are coupled by passing the projection 45 through the coupling hole 52 and hooking the projection 45 to the coupling hole 52, a structure is simple.

The projection 45 is formed of a plastically deformable plate member. The projection 45 is formed with the base portion 46 and the retaining portion 47. The base portion 46 is connected to the outer peripheral surface of the movable terminal unit 35 and projects toward an outer surface side of the coupling member 50 through the coupling hole 52. The retaining portion 47 extends from the base portion 46 and is arranged to face the region of the outer surface of the coupling member 50 not corresponding to the coupling hole 52. That is, the retaining portion 47 is arranged to face the outer surface of the coupling member 50 and be hooked to the outer surface of the coupling member 50. The boundary line 48 between the base portion 46 and the retaining portion 47 extends in the direction orthogonal to the outer surface of the coupling member 50.

According to this configuration, if the projection 45 formed into the same shape as the coupling hole 52 is passed through the coupling hole 52 and, thereafter, plastically deformed by bending the retaining portion 47 with respect to the base portion 46, the movable terminal unit 35 is assembled with the coupling member 50. Since the retaining portion 47 can be bent with the base portion 46 fixed by the jig or the like, a bending force applied to the retaining portion 47 does not act on the outer peripheral surface of the movable outer conductor 42 of the movable terminal unit 35. In this way, the deformation of the outer peripheral surface of the movable outer conductor 42 can be prevented.

The coupling hole 52 includes the slit-like holding hole portion 53 through which the base portion 46 is passed, and the slit-like mounting hole portion 54 extending from the end part of the holding hole portion 53 in the direction intersecting the holding hole portion 53. In assembling the coupling member 50 with the movable terminal unit 35, the projection 45 is prepared in advance to have the shape obtained by mirror-inverting an L shape so that the base portion 46 corresponds to the holding hole portion 53 and the retaining portion 47 corresponds to the mounting hole portion 54. In this state, the projection 45 is passed through the coupling hole 52 and, thereafter, the retaining portion 47 is bent. Since the holding hole portion 53 and the mounting hole portion 54 are connected to form a bent shape, the base portion 46 passed through the holding hole portion 53 does not move to the mounting hole portion 54. In this way, large position deviations of the coupling member 50 and the movable terminal unit 35 can be prevented.

The clearance for allowing the coupling member 50 and the movable terminal unit 35 to relatively tilt is provided between the projection 45 and the hole edge part of the coupling hole 52. According to this configuration, when the movable terminal unit 35 rocks, the projection 45 does not strongly interfere with the hole edge part of the coupling hole 52. Therefore, the deformation of the projection 45 and the hole edge part of the coupling hole 52 can be prevented.

The outer peripheral surface of the movable terminal unit 35 are constituted by the movable outer conductor 42. The coupling member 50 is electrically conductive and can contact the plurality of movable outer conductors 42. According to this configuration, grounding performance is improved since potential differences among the plurality of movable outer conductors 42 can be prevented.

Other Embodiments

The present invention is not limited to the above described and illustrated embodiment and is represented by claims. The present invention is intended to include all changes in the scope of claims and in the meaning and scope of equivalents and also include the following embodiments.

Although the coupling hole has an L shape in the above embodiment, the coupling hole may have a V shape, a J shape or the like.

Although the projection formed on the movable terminal unit is hooked to the hole edge part of the coupling hole formed in the coupling member in the above embodiment, a projection formed on a coupling member may be hooked to a hole edge part of a coupling hole formed in a movable terminal unit.

Although the plate thickness direction of the coupling member is oriented in the same direction as the facing direction of the outer surfaces of the movable terminal units and the inner surface of the peripheral wall portion in the above embodiment, the plate thickness direction of the coupling member is oriented in a direction intersecting the facing direction of the outer surfaces of the movable terminal units and the inner surface of the peripheral wall portion.

Although the three movable terminal units are coupled by one coupling member in the above embodiment, the number of the movable terminal units coupled by one coupling member may be two, four or more.

Although the movable terminal unit is a member separate from the fixed terminal unit in the above embodiment, the movable terminal unit may be integrated with the fixed terminal unit.

Although the coupling member is electrically conductive in the above embodiment, the coupling member may not be electrically conductive.

LIST OF REFERENCE NUMERALS

10 . . . first connector
11 . . . first housing
12 . . . first terminal holding portion
13 . . . first terminal accommodation chamber
14 . . . guiding portion
16 . . . first terminal unit (mating terminal unit)
17 . . . first inner conductor
18 . . . first dielectric
19 . . . first outer conductor
20 . . . second connector
21 . . . second housing (housing)
22 . . . second terminal holding portion
23 . . . second terminal accommodation chamber
24 . . . peripheral wall portion
25 . . . rocking space
27 . . . second terminal unit
28 . . . fixed terminal unit
29 . . . fixed inner conductor
30 . . . fixed dielectric
31 . . . fixed outer conductor
32 . . . support space
33 . . . diameter-reduced portion
35 . . . movable terminal unit
35P . . . base end part of movable terminal unit
35T . . . tip part of movable terminal unit
36 . . . movable inner conductor
37 . . . resilient claw piece
38 . . . movable dielectric
39 . . . insertion hole
40 . . . accommodation recess
42 . . . movable outer conductor (outer conductor)
43 . . . resilient arm portion
44 . . . diameter-expanded portion
45 . . . projection
46 . . . base portion
47 . . . retaining portion
48 . . . boundary line
50 . . . coupling member
51 . . . hooking portion
52 . . . coupling hole
53 . . . holding hole portion
54 . . . mounting hole portion
A . . . connector device
B . . . first circuit board
C . . . second circuit board

What is claimed is:

1. A connector device, comprising:
a housing to be mounted on a circuit board;
a plurality of fixed terminal units to be mounted in the housing and connected to the circuit board;
a plurality of movable terminal units individually rockable with the plurality of fixed terminal units as fulcrums, the plurality of movable terminal units being individually connected to a plurality of mating terminal units, each of the plurality of movable terminal units having an outer peripheral surface on which a projection is formed; and
a coupling member including a hooking portion to be hooked to the projection formed on each of the plurality of movable terminal units, the coupling member integrally rocking the plurality of movable terminal units.

2. The connector device of claim 1, wherein:
each of the plurality of movable terminal units has an elongated shape projecting toward a front surface side of the housing from the plurality of movable terminal units,
the housing includes a peripheral wall portion surrounding the plurality of movable terminal units, and
the coupling member is arranged in a region surrounded by the peripheral wall portion when the housing is viewed in a connecting direction from the plurality of mating terminal units.

3. The connector device of claim 2, wherein the coupling member is plate-like and so arranged that a plate thickness direction of the coupling member is orientated in the same direction as a facing direction of outer surfaces of the plurality of movable terminal units and an inner surface of the peripheral wall portion.

4. The connector device of claim 1, wherein:
the hooking portion is composed of a plurality of coupling holes penetrating through the coupling member, and
the projection of each of the plurality of movable terminal units is configured to be passed through one of the plurality of coupling holes and hooked to a hole edge part of the one of the plurality of coupling holes.

5. The connector device of claim 1, wherein:
the projection is formed of a plastically deformable plate member,
the projection is configured to project to an outer surface of the coupling member and includes:
a base portion connected to the outer peripheral surface of each of the plurality of movable terminal units and configured to pass through a coupling hole formed in the coupling member; and
a retaining portion extending from the base portion and arranged to face a region of the outer surface of the coupling member not corresponding to the coupling hole, and
a boundary line between the base portion and the retaining portion extends in a direction orthogonal to the outer surface of the coupling member.

6. The connector device of claim 5, wherein the coupling hole includes:
a slit-like holding hole portion, the base portion being passed through the holding hole portion; and
a slit-like mounting hole portion extending from an end part of the holding hole portion in a direction intersecting the holding hole portion.

7. The connector device of claim 4, wherein a clearance for allowing the coupling member and one of the plurality of movable terminal units to relatively tilt is provided between the projection and the hole edge part of the one of the plurality of coupling holes.

8. The connector device of claim 1, wherein:
the outer peripheral surface of each of the plurality of movable terminal units is constituted by an outer conductor, and
the coupling member is electrically conductive and in contact with the outer conductor.

* * * * *